No. 814,322. PATENTED MAR. 6, 1906.
T. S. PERKINS.
REVERSING SWITCH FOR ELECTRICAL CIRCUITS.
APPLICATION FILED JUNE 6, 1904.

2 SHEETS—SHEET 1.

WITNESSES:
Fred H. Miller
Otto S. Schairer

INVENTOR
Thomas S. Perkins
BY
Wesley G. Carr
ATTORNEY

No. 814,322. PATENTED MAR. 6, 1906.
T. S. PERKINS.
REVERSING SWITCH FOR ELECTRICAL CIRCUITS.
APPLICATION FILED JUNE 6, 1904.

2 SHEETS—SHEET 2.

WITNESSES:
Fred H. Miller
Otto S. Schairer

INVENTOR
Thomas S. Perkins
BY
Wesley G. Carr
ATTORNEY

UNITED STATES PATENT OFFICE.

THOMAS S. PERKINS, OF WILKINSBURG, PENNSYLVANIA, ASSIGNOR TO WESTINGHOUSE ELECTRIC & MANUFACTURING COMPANY, A CORPORATION OF PENNSYLVANIA.

REVERSING-SWITCH FOR ELECTRICAL CIRCUITS.

No. 814,322.     Specification of Letters Patent.     Patented March 6, 1906.

Application filed June 6, 1904. Serial No. 211,367.

*To all whom it may concern:*

Be it known that I, THOMAS S. PERKINS, a citizen of the United States, and a resident of Wilkinsburg, in the county of Allegheny and State of Pennsylvania, have invented a new and useful Improvement in Reversing-Switches for Electrical Circuits, of which the following is a specification.

My invention relates to switches for electrical circuits, and particularly to such as are employed for the purpose of reversing the direction of the current in either the field-magnet or armature-windings of one or more electrical motors.

My invention has for its object to provide a switch for the purpose indicated which is simple in construction and which may be operated by any convenient means that is susceptible of control from a more or less remote point.

Figure 1:
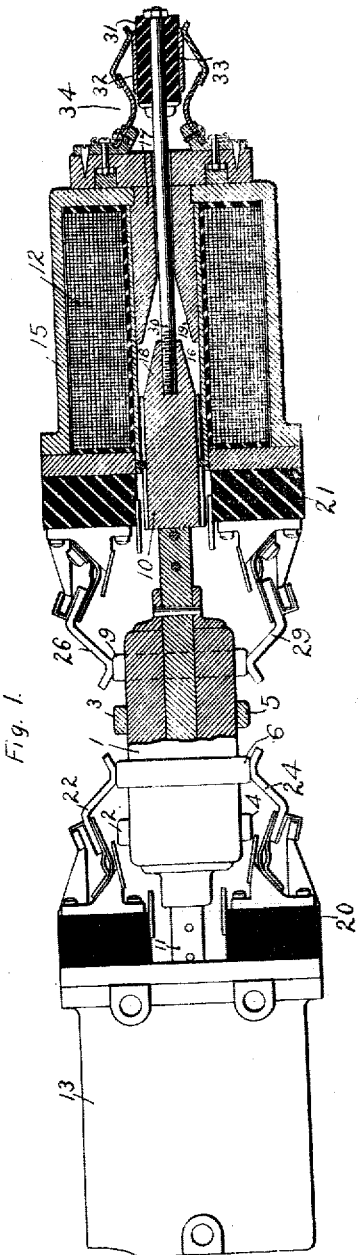
Figure 2:
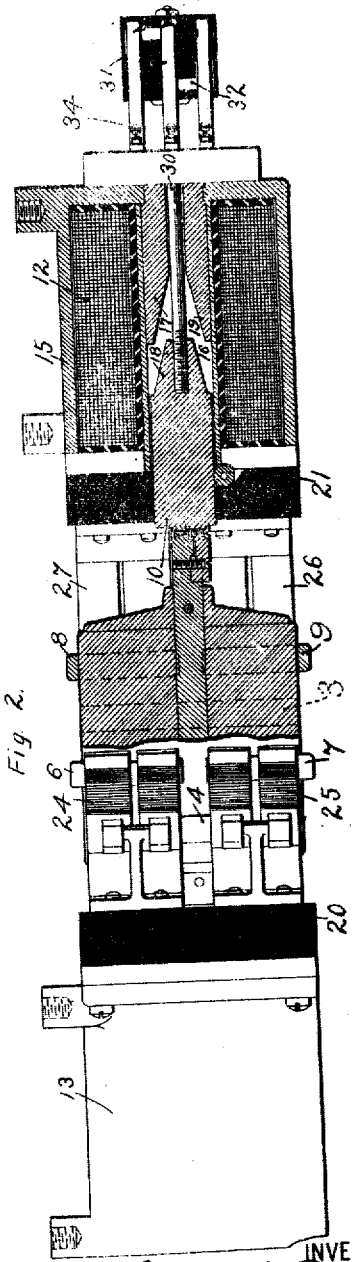
Figure 3:
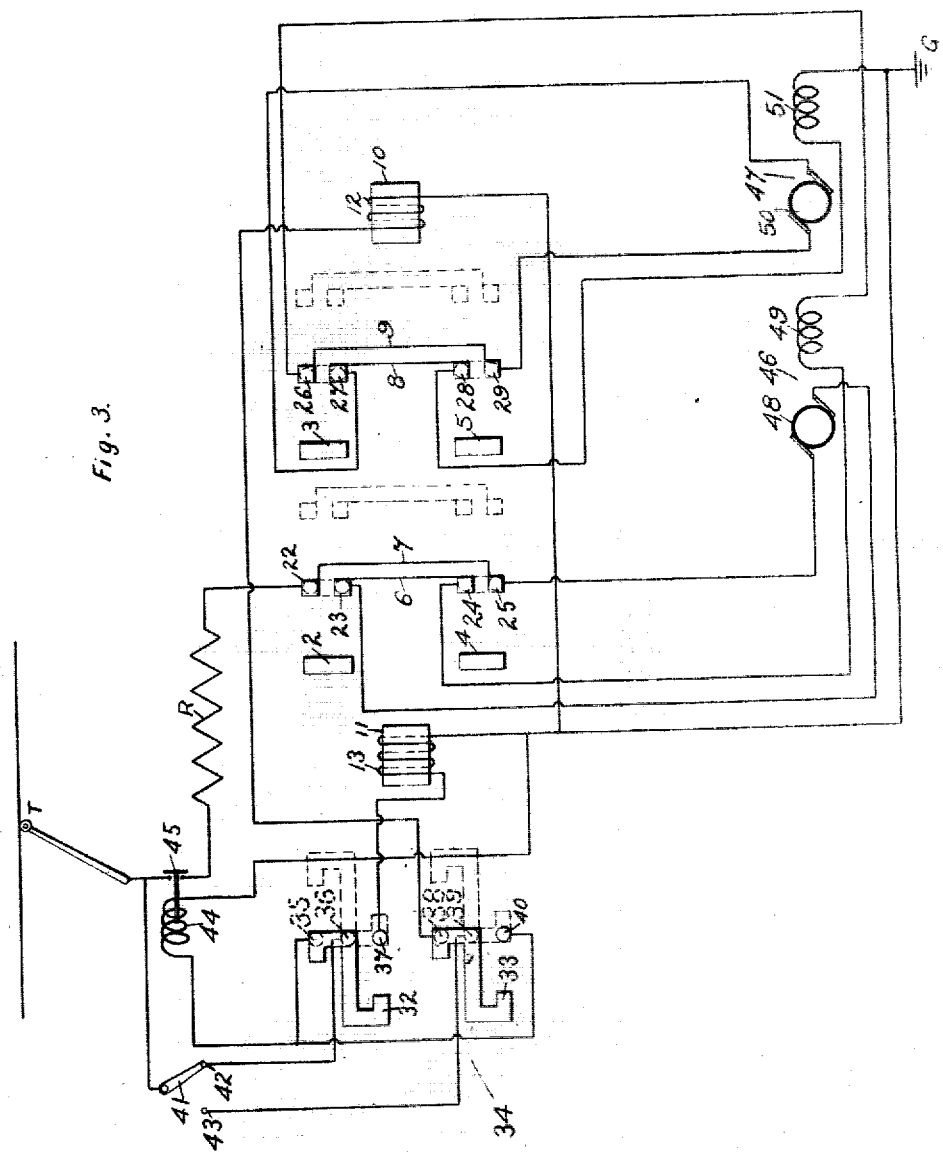

In the accompanying drawings, Figure 1 is a view, partially in plan and partially in section, of the apparatus comprising my invention. Fig. 2 is a view, partially in side elevation and partially in vertical section, of the apparatus shown in Fig. 1; and Fig. 3 is a diagrammatic view of a system embodying my invention.

In the operation of electric cars which are equipped with one or more motors it is necessary to reverse the direction of the current through either the field-magnet or armature-windings of the motors in order to reverse the direction of rotation of the armatures, and this has ordinarily been done by means of a hand-operated switch to which the terminals of the said windings are connected. It is desirable, however, when several motors of large capacity are to be controlled, or when several cars, each of which is equipped with several motors, are to be controlled from a single point in the train, that the reversing-switches be actuated by some convenient means which may be controlled by the same master-switch which controls the speed of the motors.

Mounted upon a rectangular wooden block 1 or a block of any other suitable insulating material are conducting-strips 2, 3, 4, 5, 6, 7, 8, and 9, the straight strips 2 and 3 being mounted upon the opposite side of the block from that to which the strips 4 and 5 are secured. The strips 6, 7, 8, and 9 are U-shaped and are mounted so that each has contact-surfaces on opposite sides of the block 1.

The block 1 is rigidly connected to the ends of and is actuated by the movable portions 10 and 11 of solenoid-cores, the coils 12 and 13 for which are inclosed by iron shells 15 of such form that the circuits for the magnetic fluxes produced by the windings are complete except for gaps 16 between the movable portions 10 and 11 of the solenoid-cores and stationary portions 17. The free ends 18 of the movable portions 10 and 11 of the solenoid-cores have conical shapes, and the ends of the stationary portions 17, with which the movable portions are adapted to engage, have corresponding conical depressions 19, the object of this construction being to provide a magnetic circuit having a minimum air-gap with a maximum amount of travel of the movable portions 10 and 11.

Secured to the respective iron shells 15 are insulating-blocks 20 and 21, upon which are mounted contact-fingers 22, 23, 24, and 25 and 26, 27, 28, and 29, respectively, fingers 22, 23, 26, and 27 being so disposed that they engage the conducting-strips 7, 6, 9, and 8, respectively, on the one side of the block 1 and the remaining fingers 24, 25, 28, and 29 so that they engage the conducting-strips 6, 7, 8, and 9 on the opposite side of the block.

In Figs. 1 and 2 I have shown each of the contact-fingers as comprising two independently-spring-actuated elements in order to increase the current-carrying capacity of the switch; but evidently the fingers may comprise any other number of independently-actuated elements, depending upon the amount of current which the reversing-switch is required to conduct.

Secured to the conical end 18 of the movable portion 10 of one of the solenoid-cores and movable therewith is a rod 30, having at its outer end an insulating drum or block 31, upon the opposite sides of which are mounted conducting-strips 32 and 33 of an interlocking switch 34. Secured to the corresponding end of the magnet-shell 15 is an insulating-block, upon which are mounted contact-fingers 35, 36, 37, 38, 39, and 40, the fingers 35, 36, and 37 being adapted to engage with the conducting-strip 32 and the fingers 38, 39, and 40 being adapted to engage with the conducting-strip 33.

Evidently the details of construction of the switch 34 and the operating means may be varied considerably from what is shown and described, and the switch may be actuated in conjunction with the reversing-switch by any suitable means other than the rod 30 without departing from the invention.

In Fig. 3 I have shown a simple system of control for two electric motors, one of the elements of which is a reversing-switch that embodies my invention. A master-switch arm 41 is connected directly to a trolley T or to any other suitable terminal device of a source of energy, and contact-terminals 42 and 43 are respectively connected to contact-fingers 36 and 39 of the interlocking switch 34 with which the respective conducting-strips 32 and 33 constantly engage. A solenoid 44, one terminal of which is connected to the contact-terminals 35 and 40 and the other to the ground G, is employed to operate a unit-switch 45 or any other suitable device, which is employed for closing a circuit through a resistance R, the reversing-switch and the motors 46 and 47. In a more elaborate system of control more than one solenoid 44 would probably be employed for the purpose of operating switches which cut out resistance from the motor-circuits or which connect the motors in series or in parallel relation to each other. It is possible to arrange these solenoids to operate in an indefinite number of combinations, a description of which is not necessary to a full understanding of the present invention. Terminals of each of the operating-solenoids 12 and 13 are respectively connected to contact-fingers 38 and 37, and the other two terminals are connected together and to the ground G.

If the master-controller switch-arm 41 is in position to make contact with the terminal 42, the reversing-switch occupies the position shown in Figs. 1 and 2 and the position shown in full lines in Fig. 3, which position may be assumed to correspond to forward motion of a car or train upon which the system is installed. The circuit is then completed from the trolley T, through the master-controller switch-arm 41, contact-terminal 42, contact-finger 36, conducting-strip 32, contact-finger 35, solenoid 44, to the ground G. The switch 45 is then closed and the main motor-circuit is from the trolley T, through the switch 45, resistance R, contact-finger 22, conducting-strip 7, and contact-finger 25, armature 48, contact-finger 23, conducting-strip 6, contact-finger 24, field-magnet winding 49, contact-finger 26, conducting-strip 9, contact-finger 29, armature 50, contact-finger 27, conducting-strip 8, contact-finger 28, field-magnet winding 51, to the ground G. If, however, it is desired to reverse the motion of the car or train, the master-controller switch-arm 41 will be moved to engage contact-terminal 43, thereby closing a circuit from the trolley T, through the switch-arm 41, terminal 43, contact-finger 39, conducting-strip 33, contact-finger 38, and solenoid 12, to the ground G. Energizing of the solenoid 12 effects the operation of the reversing-switch and causes the conducting-strips of the reversing-switch and interlocking switch to assume the position shown in dotted lines in Fig. 3. Then the circuit is completed from the trolley T, through the switch-arm 41, terminal 43, contact-finger 39, conducting-strip 33, contact-finger 40, and solenoid 44, to the ground G. The main motor-circuit is then from the trolley T, through the switch 45, resistance R, contact-finger 22, conducting-strip 2, contact-finger 23, armature 48, contact-finger 25, conducting-strip 4, contact-finger 24, field-magnet winding 49, contact-finger 26, conducting-strip 3, contact-finger 27, armature 50, contact-finger 29, conducting-strip 5, contact-finger 28, and field-magnet winding 51, to the ground G. In this position of the reversing-switch the direction of the flow of current through the armatures 48 and 50 is reversed from what it is when the reversing-switch is in the position shown in full lines, and consequently the direction of rotation of the armatures is reversed.

The reversing-switch may be operated by any suitable means other than electromagnetic—such, for instance, as pneumatic devices having valves which are governed by electromagnets the circuits of which may be controlled from a remote point.

Other features of the reversing-switch may evidently be varied within limits from what is shown and described without departing from the spirit of the invention, and I do not wish the invention to be limited except by such restrictions as are imposed by the prior art.

I claim as my invention—

1. The combination with two sets of stationary contact-terminals each of which comprises two pairs, of a longitudinally-movable block having two sets of contact-strips that engage the corresponding stationary contact-terminals to connect them in different relations, and means for actuating said block.

2. The combination with two sets of contact-fingers each of which comprises two pairs, of a longitudinally-movable block having two sets of contact-strips corresponding to the sets of contact-fingers, one pair of each set of strips serving to connect fingers of the same pair together and the other pair of strips serving to connect fingers of different pairs together, and means for actuating the block in either direction.

3. A switch comprising two sets of contact-fingers, each of which comprises two pairs, two sets of conducting-strips, a support therefor and means for moving said support longitudinally in either direction so that one pair of strips in each set serves to connect fingers of the same pair together and the other pair of strips serves to connect fingers of different pairs together.

4. A switch comprising two sets of pairs of contact-fingers, two sets of pairs of conducting-strips, a support therefor and means for moving said support longitudinally to cause the strips to respectively engage and electrically connect contact-fingers of the respective sets in one combination for one position of the switch and in another combination for the other position of the switch.

5. A switch comprising a longitudinally-movable block of non-conducting material and two sets of pairs of conducting-strips mounted thereon and two sets of pairs of contact-fingers disposed at opposite sides of said block and arranged to so engage said strips as to connect fingers of the same pair together or fingers of different pairs together according to the position of the block.

6. A switch comprising a block of non-conducting material, two sets of pairs of conducting-strips mounted thereon and two sets of pairs of contact-fingers disposed at opposite sides of said block and arranged to so engage said strips as to either connect fingers of the same pair or fingers of different pairs together, and means for effecting longitudinal movement of said block.

7. A switch comprising two sets of pairs of contact-fingers, a longitudinally-movable block of non-conducting material and two sets of pairs of conducting-strips mounted thereon, the strips of one set being arranged to electrically connect the contact-fingers of one pair or of different pairs of one set together and the strips of the other set to electrically connect the fingers of one pair or of different pairs of the other set together, according to the position of the block.

8. A switch comprising contact-fingers, a longitudinally-movable block of non-conducting material and sets of conducting-strips mounted thereon, one set of strips having engaging surfaces for said fingers on one side only of said block and the other set having engaging surfaces on two or more sides thereof.

9. A switch comprising contact-fingers, a longitudinally-movable block of non-conducting material and sets of conducting-strips mounted thereon, one set of strips extending laterally across one side of said block and the other set partially across two sides thereof.

10. A switch comprising two sets of pairs of contact-fingers, two sets of pairs of laterally-movable conducting-strips arranged to engage respectively therewith and electromagnets which are respectively energized to effect the movement of said strips in the one direction or the other to connect contact-fingers of one pair or of different pairs together.

11. A switch comprising two sets of pairs of contact-fingers, two sets of pairs of laterally-movable conducting-strips arranged to engage respectively therewith, magnet-windings and armatures therefor which carry said conducting-strips.

12. A switch comprising two sets of pairs of contact-fingers, a longitudinally-movable block of insulating material, two sets of pairs of conducting-strips mounted thereon and electromagnets having their armatures attached to said block.

13. A switch comprising two sets of pairs of contact-fingers, a longitudinally-movable block of insulating material, two sets of pairs of conducting-strips mounted thereon, magnet-windings and armatures therefor which support said block.

14. A switch comprising contact-fingers, sets of laterally-movable contact-strips arranged to engage respectively therewith, magnet-windings, armatures therefor which carry said conducting-strips and controlling means for said magnet-windings operated by the movement of the switch.

15. A switch comprising contact-fingers, sets of laterally-movable conducting-strips arranged to engage respectively therewith, operating magnet-windings, armatures therefor which carry said conducting-strips and means actuated by the movement of the switch for making and breaking the circuits of the operating magnet-windings.

In testimony whereof I have hereunto subscribed my name this 27th day of May, 1904.

THOMAS S. PERKINS.

Witnesses:
H. B. MYER,
BIRNEY HINES.